United States Patent Office 3,529,162
Patented Sept. 15, 1970

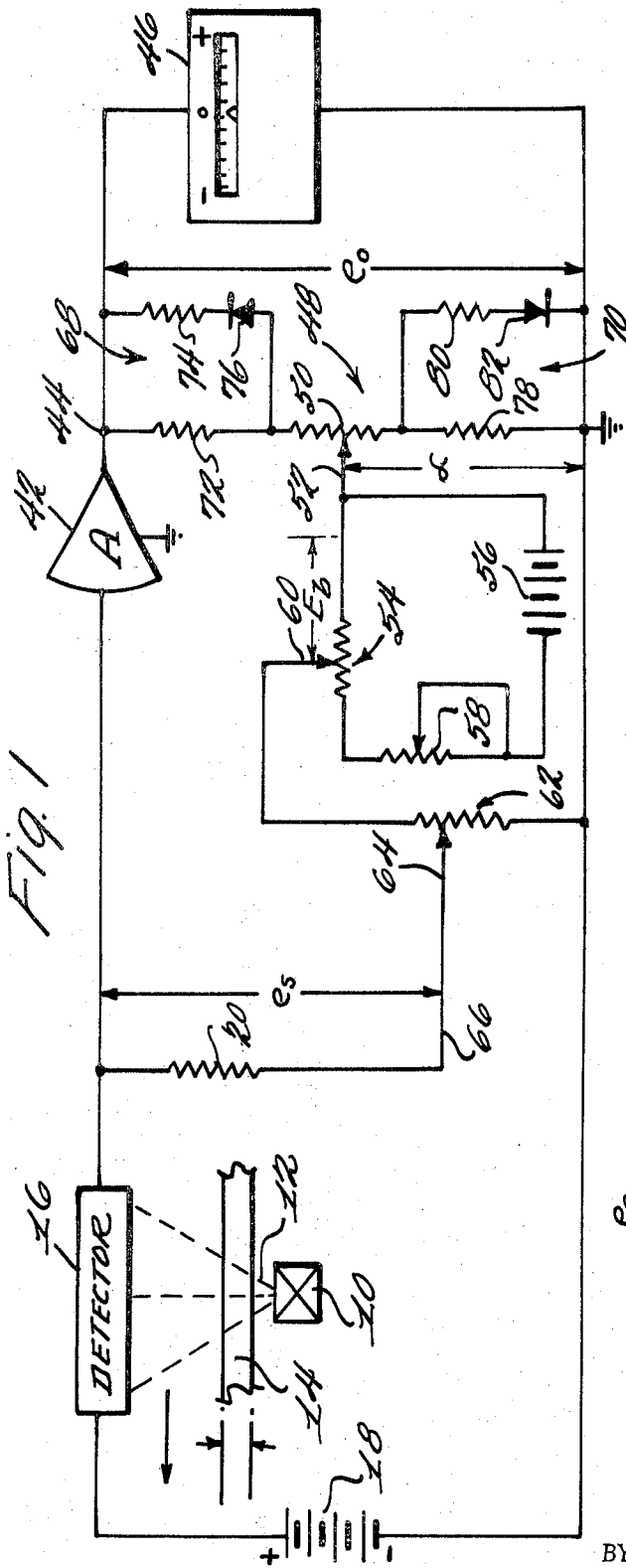

3,529,162
ABSORPTION CURVE MATCHING CIRCUIT IN NUCLEONIC MEASURING SYSTEM
Paul H. Troutman, Columbus, Ohio, assignor to Industrial Nucleonics Corporation, a corporation of Ohio
Filed May 2, 1967, Ser. No. 635,436
Int. Cl. G01t *1/16*
U.S. Cl. 250—83.3        9 Claims

ABSTRACT OF THE DISCLOSURE

A nucleonic measuring system which normally operates over a limited portion of a non-linear absorption curve, is extended in this case in its operation along that curve with substantially uniform sensitivity to weight-per-unit area changes, by automatically adjusting the sensitivity as a function of amplifier output voltage.

PREAMBLE

This invention relates to a measuring system and more particularly to a nucleonic gauging system for determining the weight per unit area of material which normally moves through the gauge.

As is well known, such gauges are used to measure not only weight per unit area, but thickness if the density of the material is constant, or density if the thickness of the material is constant. In either event, such a gauge measures a given characteristic of the material effectively on the basis of weight per unit area. For convenience, the description of this invention is in terms of measuring thickness of a sheet of material which passes through the gauge, but it is to be understood that no limitation is intended to measurement of thickness or a sheet per se.

This invention concerns itself with a system which has the ability to measure the radiation intensity of a signal emanating from a radiation source. In general, there are two types of nucleonic radiation gauges. One is a transmission type of gauge, in which the source and detector are on opposite sides of the material being gauged. The other is the reflection or backscatter type, in which the source and detector are both on the same side of the material being gauged. In either case, intensity of the radiation received by the detector varies in accordance with the weight per unit area or area density of the absorbing material being measured. The present invention is applicable to either type of gauge.

Nucleonic systems for measuring weight per unit area or basis weight are well known. For example, such a system is described in Chope Pat. 2,829,268. The system in that patent requires a servo arrangement for measuring. To obviate the necessity of servo arrangements, electronic systems have been developed, amongst which are those described in the patents to Thompson et al. No. 2,945,130, Radley No. 2,965,847, Otis No. 2,968,727, Hanson No. 3,235,732, and in the Maltby application Ser. No. 589,021 filed Oct. 24, 1966 as well as in my copending application Ser. No. 616,958, filed Feb. 17, 1967. These latter patents and applications are directed to developments of the all-electronic type as far as measuring itself is concerned, since servo systems or the like are not necessary to provide a readout signal of the instant thickness measurement.

The present invention is also of that all-electronic type. In nucleonic gauges of this type, the absorption curve approximates a logarithmic curve. With a given span setting, the gauge is able to operate linearly along the curve, and such a straight line approximation is usually sufficiently accurate, as long as the range of operation is not too great. However, as the range is widened the deviation between the actual absorption curve and a straight line becomes wider. It is therefore the main purpose of this invention to provide equipment that will allow operation along the absorption curve with substantially uniform sensitivity to changes in weight per unit area over a wider range than that possible by a single straight line approximation to the curve.

To accomplish this purpose, this invention employs an automatic span adjusting device by which the ratio of changes in the output voltage of an amplifier to the resulting changes in the amount of that voltage used, varies to effect operation with substantially uniform sensitivity to changes in weight per unit area, from one substantially straight line section of the absorption curve to another, thereby providing for the wider range desired.

Further objects and advantages of this invention will become apparent to those of ordinary skill in the art upon reading the appending claims and the following detailed description of this invention in conjunction with the drawings, wherein:

FIG. 1 is a schematic drawing of an embodiment of this invention, and

FIG. 2 represents an absorption curve and the wider operation available from successive straight line approximations thereto.

GENERAL CIRCUIT DESCRIPTION

The circuitry shown in FIG. 1 is similar to the FIG. 1 circuitry of my copending application Ser. No. 616,958, except for the addition to the span adjustment arrangement described in detail below. As is apparent herein, the present invention is applicable not only to the particular circuit illustrated, but to circuits of the type discussed in the above-mentioned patents and applications.

In FIG. 1, nucleonic source 10 provides nucleonic radiations 12 some of which pass through the material 14 which is moving through the radiation path. It is this material which is being gauged as to its thickness. Those radiations not absorbed by the material are detected by detector 16, which is operated by battery 18.

As previously indicated, this invention may be incorporated into a backscatter gauge as well as the transmission type of gauge shown. In either case, the output of detector 16 is connected to a high megohm resistor 20. In operation, the detector output current which traverses resistor 20, is proportional to the quantity of radiations incident upon the detector, and this current in turn, develops across resistor 20 a signal voltages proportional to the detector output current.

The graph of that signal voltage versus thickness of material 14 is known in the art as the absorption curve. As shown in FIG. 2, this curve 21 is non-linear and approximates a logarithmic curve. In a manner explained below, the circuitry of FIG. 1 is set in a static condition to operate at point 22 for a target or desired thickness $x_0$ to cover a thickness range or span $x_1$ to $x_2$ between points 24 and 26 on the curve. As shown by the straight line 28 through operating point 22, accuracy of operation is less the further in either direction from point 22 that line 28 is extended. The difference between the straight line 28 and the curve at points 24 and 26 is error. If line 28 were extended further, it is apparent that the error would be increased more and more as the extension becomes longer. Therefore, it is necessary, in present practice to operate the system over a small thickness range, for high accuracy and shift the operating point from point 22 upward to downward along the absorption curve, in order to measure a substantial different thickness with the same accuracy. For example, with the slope of the straight line changed to that of line 30, the operating point is moved to point 32 so that another range is measured, between points 34 and 24 on the absorption curve, corresponding to a thickness $x_3$ and $x_1$, respectively, In like manner, a greater thickness range may be measured in the opposite direction by changing the slope of line 28 to be that of line 36 for operation about operating point 38, which allows measurement over a range betwen points 26 and 40 along the absorption curve corresponding to thickness $x_3$ and a maximum thickness $x_4$, respectively.

It is apparent that a shift in operating point changes the portion of the absorption curve over which the thickness measurements are made. The slope of the straight lines approximating the range changes, resulting in a different sensitivity, or change in voltage $e_s$ for a given change in thickness. In other words, a change in thickness $\Delta x$ will produce a different $\Delta e_s$ at each operating point. The present practice is to calbrate the system for each range, or to adjust the bucking voltage bridge for each range, to obtain a substantially uniform or constant change in $e_s$ for a change of $\Delta x$ in each range. The uniform sensitivity is desirable for several reasons, such as to permit the use of only one scale calibrated in thickness for a wide range of thickness changes.

The present invention maintains the system output voltage change $\Delta e_0$ for a given $\Delta x$, substantially constant over a wide thickness range that normally would require several shifts in operating point to obtain the same high accuracy measurements. Reference is made to FIG. 1 for one embodiment of the present invention.

Before describing the specific device for extending the range, the circuit of FIG. 1 is otherwise described in detail.

At the upper end of the detector output resistor 20, a connection is made to a high gain amplifier 42, which produces an output voltage $e_0$ from junction 44 to ground. This voltage is connected directly across an indicator 46 or other desired utilization means for reading out the thickness, and if desired for regulating the thickness of material 14.

Also connected to receive the amplifier output voltage is the sensitivity adjustment device generally designated 48. A portion of the amplifier output voltage is tapped off potentiometer 50 by tap 52 and applied to one end of another potentiometer 54. This potentiometer is connected across a battery 56 and a series rheostat 58 for developing a desired potential across the potentiometer. The portion of the amplifier output voltage selected at tap 52 is serially connected with a portion of the voltage across potentiometer 54 as selected by potentiometer tap 60. The sum of these voltages is, in turn, connected across potentiometer 62. The voltage between tap 64 and ground is then connected by line 66 to the lower end of the detector output resistor 20.

As fully explained in my copending application Ser. No. 616,958, potentiometer 54 is calibrated in terms of thickness of material 14 so as to set the operating point of the system. In other words, various settings of the tap 60 of potentiometer 54 correspond to various desired thicknesses for different materials being sensed as to their thickness. Standardization of the system to compensate for various changeable factors such as source decay and foreign matter buildup on the source or in the radiation column, is effected by changing the position of tap 64 under the conditions described in my aforesaid copending application.

Variation of the sensitivity potentiometer tap 52 causes a variation in the amount of change in the amplifier output signal, for a given change in the material characteristic.

Once the tap is appropriately set to effect the desired sensitivity, the system is ready to operate, since the sensitivity adjustment device 48 automatically operates to extend operation of the system to obtain a substantially uniform sensitivity to changes in the material characteristic in either direction along absorption curve 21 of FIG. 2.

Sensitivity adjustment device 48 includes not only potentiomter 50 but an upper impedance changing circuit 68 and a lower impedance changing circuit 70. The upper impedance changing circuit 68 includes a resistor 72 which is serially connected between junction 44 and the upper end of potentiometer 50. Connected in parallel across resistor 72 is a series circuit, including a resistor 74 and diode 76.

In like manner, the lower impedance changing circuit 70 includes a resistor 78 connected between the lower end of potentiometer 50 and ground. In parallel with resistor 78 is the series circuit of resistor 80 and diode 82.

A voltage divider is formed by the sensitivity adjustment device 48, and in operation it responds to the amplitude of the amplifier output voltage $e_0$ to automatically control or regulate the portion of the amplifier output voltage which appears between tap 52 and ground. When the amplifier output voltage is zero or some small voltage below the threshold of the diodes 76 and 82, these diodes do not conduct appreciable current. At that time, the sensitivity adjustment circuit appears to include only the resistors 72 and 78 along with potentiometer 50, since resistors 74 and 80 are then effectively out of the circuit. However, during use of the system to measure wide variations of a characteristic in material 14, these latter resistors are added into the circuit by the automatic operation of the span adjustment device 48, which changes the effective setting of the sensitivity potentiometer 50 as a function of the amplifier output voltage. This is accomplished by changing the impedance at the upper end of the voltage divider by shunting in resistor 74, or by changing the impedance at the lower end of the voltage divider by shunting in resistor 80. For example, when the system is measuring material thickness and the thickness increases, the detector 16, assuming it is an ionization chamber, will produce less voltage $e_s$ across high meg resistor 20. Voltage $e_s$ goes less negative with respect to the input of amplifier 42, which is kept at virtual ground. The output $e_0$ of amplifier 42 goes positive. When $e_0$ increases sufficiently in a positive direction, diode 82 begins to conduct more current, thereby adding resistor 80 to the effective circuit. This causes the total impedance of the lower end of the voltage divider to be decreased, since resistor 78 is now paralleled by resistor 80. In turn, the incremental voltage change at tap 52, between tap 52 and ground, decreases for an incremental increase change in thickness of the measured material. This change results in a different proportion of the amplifier output voltage being fed back by tap 52. While the prior art automatically varied the tap 52 voltage in accordance with variations in the amplifier output voltage, there was no change in the proportion of amplifier output voltage to tap voltage for a given change in material thickness. With the present invention, however, that ratio changes, thereby maintaining substantially constant the sensitivity of the system to increased thicknesses over a greater range.

With diode 82 conducting, the effective voltage divider appears to have decreased, thereby affecting the proportion of tap 52 voltage, which in turn, when fed back in the manner previously described so as to cause the voltage between tap 64 and ground to equal the signal voltage $e_s$, causes the gain of amplifier 42 to increase.

For a decrease in thickness of material 14, $e_s$ goes more negative with respect to the input of amplifier 42, and $e_0$ goes negative. If the signal voltage $e_s$ increases so as to be in an area of point 32 on the absorption curve of FIG. 2, beyond the range for accurate, straight line approximation over line 28, diode 76 will begin to conduct more current. This places resistor 74 in the circuit, thereby reducing the effective impedance of resistor 72. For such a negative change in amplifier output voltage, the voltage at tap 52 will also swing negatively, but at a different rate or slope than it would if diode 76 were not conducting appreciable current. The incremental voltage change at tap 52, between tap 52 and ground, increases for an incremental change in thickness of the measured material. In this manner, the effective sensitivity of the system to a given decrease in thickness is uniform over a wider thickness range. Indicator 46 can be calibrated in equal divisions of thickness for a thickness range over a substantial portion of absorption curve 21 (FIG. 2).

From the foregoing it can be appreciated that the automatic sensitivity adjustment device will allow the range of thickness that may be accurately measured to widen. The relationship achieved by the present invention can be expressed mathematically by considering the voltages in the circuit of FIG. 1, ignoring the effect of potentiometer 64. The relation is that $$-e_s + E_b = \alpha e_0 \qquad (1)$$

where $e_s$ is the voltage across high meg resistor 20

$Eb$ is the voltage set in for the operating point by adjusting tap 60 of potentiometer 54, and $\alpha$ is the ratio of amplifier output voltage $e_0$ appearing at tap 52 of potentiometer 50 with respect to ground.

The present invention provides a uniform sensitivity for changes in thickness, represented by the relation $$\frac{\Delta e_a}{\Delta x} \times \frac{\Delta e_o}{\Delta e_a} = \frac{\Delta e_o}{\Delta x} = k \qquad (2)$$

where $\Delta e_0$ is the change in output voltage for a thickness change of $\Delta x$, and $k$ is a constant.

As the thickness changes about the operating point 22 (FIG. 2) for example, the absorption curve slope changes, producing a different $\Delta e_0/\Delta x$. The sensitivity adjustment means according to the present invention changes $\alpha$ automatically in response to $e_0$ to maintain the relation of Equation 2 above. Without the sensitivity adjustment means, the system indicator 46 could not be calibrated in equal units of thickness for a wide thickness range. Instead, the indicator scale would have to be calibrated in a non-linear manner, or the system would have to have a series of operating points and ranges to cover the same thickness range in a servo-null balance system approximating a linear relation, as described in connection with FIG. 2.

In my above-mentioned copending application Ser. No. 616,958, an alternative to the basic circuit of FIG. 1 herein is disclosed. That alternative is embodied by connecting the full amplifier output voltage to the calibrated potentiometer 54, and then connecting the span potentiometer tap to indicator 46. This alternative may also be employed with the automatic sensitivity adjusting device of the present invention. In addition, it is to be noted that the present automatic sensitivity adjusting device may be employed in lieu of the span potentiometer 66 in the above-mentioned Maltby application. Furthermore, in any case, diodes 76 and 82 may be replaced by Zener diodes or the like.

While just one diode-resistor shunting path is shown and described above for each impedance reducing circuit 68 and 70, one or more other similar shunt paths may be added as desired, for example, to allow a closer following of the absorption curve by shortening the length of the linear operation of each shunt path. Different resistance values or bias diodes may be used to shift the operating points. Other voltage responsive circuits, such as operational amplifier function generators, can be used to obtain the described substantially constant sensitivity for a given change in material characteristic over a wide range.

Thus it is apparent that the foregoing disclosure has provided for this invention all of the objects and advantages herein stated, along with those that become apparent upon reading this disclosure.

Further objects and advantages, and even modifications of the invention will become apparent to those skilled in the art upon obtaining an understanding of this invention through the foregoing disclosure and drawings, which are intended to be illustrative and not limitive. The scope of the invention is defined by the appended claims.

What is claimed is:

1. A nucleonic system for measuring a given characteristic of material effectively on the basis of weight per unit area of said material, comprising:
    means including a nucleonic source and detector for establishing a nucleonic radiation path from said source to said detector through which path said material may pass to be measured,
    a detector output resistor connected to receive detector current for developing a signal voltage proportional to the detector current and variable with said characteristic in accordance with an absorption curve,
    means including amplifier means coupled to said detector output resistor for developing an amplifier output voltage corresponding in value to the measure of said material characteristic, and
    sensitivity adjustment means connected to receive said amplifier output voltage and automatically responsive to variations in said signal voltage beyond a predetermined value, corresponding to a given change in weight per unit area, to cause said system to effectively operate with a uniform sensitivity to changes in weight per unit area.

2. A nucleonic system for measuring a given characteristic of material effectively on the basis of weight per unit area of said material, comprising:
    means including a nucleonic source and detector for establishing a nucleonic radiation path from said source to said detector through which path said material may pass to be measured, a detector output resistor connected to receive detector current for developing a signal voltage proportional to the detector current and variable with said characteristic in accordance with an absorption curve,
    amplifier means connected to one end of said detector output resistor for developing an amplifier output voltage proportional to the value of said material characteristic,
    utilization means,
    feedback means connected at one end to said detector output resistor,
    sensitivity adjustment means connected to receive said amplifier output voltage and to deliver a portion thereof to one of said utilization and feedback means the other of which is coupled to said amplifier,
    said sensitivity adjustment means including means for dynamically varying said amplifier output voltage portion in response to a given change in the material characteristics to cause operation of the system with a uniform sensitivity to changes in said characteristic.

3. A system as in claim 2 wherein said sensitivity adjustment means is connected to said feedback means.

4. A nucleonic system as in claim 2 wherein said sensitivity adjustment means includes at least two impedance paths connected in parallel with one of said paths including means for preventing current from passing through it except when the amplifier output voltage changes to at least a certain value to cause the total impedance of the two paths to decrease and thereby change the proportion of amplifier output voltage connected to said one means.

5. A system as in claim 2 wherein said sensitivity adjustment means is a voltage divider connected across the output of said amplifier means and has a tap connected to said feedback means,
    said voltage divider having at least a part thereof on one side of said tap connected in parallel with a first path which operates only when the said amplifier output voltage is at least a certain value in one direction from zero to change the proportion of amplifier output voltage fed back from said tap and to allow said system to operate with a substantially uniform sensitivity to changes in said characteristic over said absorption curve in one direction,
    said voltage divider having at least another part on the other side of said tap connected in parallel with a second path operative only when the said amplifier output voltage changes to at least a predetermined value in the opposite direction to change the proportion of amplifier output voltage fed back from said tap to allow said system to operate with a substantially uniform sensitivity to changes in said characteristic over said curve in the opposite direction 6. A nucleonic system for measuring a given characteristic of material effectively on the basis of weight per unit area of said material, comprising:

means including a nucleonic source and detector for establishing a nucleonic radiation path from said source to said detector through which path said material may pass to be measured, a detector output resistor connected to receive detector current for developing a signal voltage proportional to the detector current and variable with said characteristic in accordance with an absorption curve, an amplifier connected to one end of said resistor for developing an amplifier output voltage, and feedback means between said amplifier and the other end of said resistor for opposing said signal voltage with a feedback voltage to cause operation of said amplifier on the difference of said signal and feedback voltages over a predetermined range of signal voltage on said absorption curve, said feedback means including means for setting the operating point in the midst of said range for a desired material characteristic to cause the system to operate with a substantially uniform sensitivity to changes in said characteristic over said predetermined range, said feedback means further including sensitivity adjustment means for dynamically and automatically regulating, in response to variations in said signal voltage the proportion of amplifier output voltage connected to said operating point setting means for causing a substantially uniform sensitivity to changes in said characteristic over said range.

7. A system as in claim 6 wherein said sensitivity adjustment means includes a voltage divider arrangement having said amplifier outtput voltage connected across it and a tap for connecting the regulated proportion of amplifier output voltage to said operating point setting means, said voltage divider having first and second resistors on opposite sides of said tap respectively shunted by oppositely poled diodes in series with respective third and fourth resistors for causing a shift in the ratio of amplifier output voltage to the regulated proportion thereof fed back, and consequently of the effective operating of the system, when the amplifier output voltage increases in the appropriate direction to cause the respective diode to conduct significant current through its series resistor to reduce the effective impedance of the respective first or second resistor.

8. A system as in claim 1 wherein said sensitivity adjustment means comprises means responsive to said amplifier output voltage for increasing the sensitivity of said amplifier output voltage to changes in said signal voltage when said amplifier output voltage deviates beyond a fixed amount in one direction from a predetermined value, and for decreasing the sensitivity of said amplifier output voltage to changes in said input voltage when said amplifier output voltage deviates beyond a fixed amount in the opposite direction from said predetermined value.

9. A system as in claim 8 including utilization means and feedback means each receiving at least a portion of said amplifier voltage, said feedback means being connected to one end of said detector output resistor, and wherein said sensitivity adjustment means includes at least two impedance paths connected in parallel with one of said paths including means for preventing current from passing through it except when the amplifier output voltage changes to at least a certain value to cause the total impedance of the two paths to decrease and thereby change the proportion of amplifier output voltage connected to said one of said utilization and feedback means.

References Cited

UNITED STATES PATENTS 3,235,732 2/1966 Hansen.
3,306,103 2/1967 Davis.

FOREIGN PATENTS 1,007,874 10/1965 Great Britain.

OTHER REFERENCES

Mariner Instrumentation: What Will It See on Venus? by Chase et al., from Electronics, Dec. 14, 1962, pp. 42–45.

ARCHIE R. BORCHELT, Primary Examiner

U.S. Cl. X.R.

250—83.6